United States Patent [19]
Uetake et al.

[11] Patent Number: 5,416,651
[45] Date of Patent: May 16, 1995

[54] APPARATUS FOR MAGNETICALLY RECORDING DIGITAL DATA

[75] Inventors: Akihiro Uetake; Naofumi Yanagihara, both of Tokyo; Keiji Kanota, Kanagawa, all of Japan

[73] Assignee: Sony Corporation, Tokyo, Japan

[21] Appl. No.: 785,413

[22] Filed: Oct. 30, 1991

Related U.S. Application Data

[63] Continuation-in-part of Ser. No. 768,871, Oct. 29, 1991.

[30] Foreign Application Priority Data

Oct. 31, 1990 [JP] Japan ................................ 2-294672
Mar. 8, 1991 [JP] Japan ................................ 3-068777

[51] Int. Cl.$^6$ .......................... G11B 5/09; G11B 5/02; G11B 5/58; H04N 5/78
[52] U.S. Cl. .................... 360/48; 360/19.1; 360/77.15
[58] Field of Search .............. 360/48, 19.1, 77.14, 360/77.15, 46; 358/133; 371/37.1, 20.4

[56] References Cited

U.S. PATENT DOCUMENTS

| | | | |
|---|---|---|---|
| 3,852,810 | 12/1974 | McGrath et al. | 360/48 |
| 4,353,098 | 10/1982 | Heinz et al. | 360/19.1 |
| 4,380,779 | 4/1983 | Kitamura et al. | 360/19.1 |
| 4,571,641 | 2/1986 | Fujiki et al. | 360/19.1 |
| 4,613,860 | 9/1986 | Currie et al. | 371/37.1 X |
| 4,651,239 | 3/1987 | Omori et al. | 360/19.1 |
| 4,670,796 | 6/1987 | Kobayashi et al. | |
| 4,845,560 | 7/1989 | Kondo et al. | 358/133 |
| 4,896,224 | 1/1990 | Tobe et al. | 360/19.1 |
| 4,907,101 | 3/1990 | Keesen et al. | 360/48 |
| 4,910,681 | 3/1990 | Ohtake et al. | 371/20.4 X |
| 4,926,169 | 5/1990 | Tong et al. | 371/37.1 X |
| 5,060,088 | 10/1991 | Dolivo et al. | 360/46 |
| 5,253,122 | 10/1993 | Chiba et al. | 360/33.1 |

FOREIGN PATENT DOCUMENTS

| | | |
|---|---|---|
| 0353758 | 2/1990 | European Pat. Off. |
| 0367264 | 5/1990 | European Pat. Off. |
| 0445727A2 | 9/1991 | European Pat. Off. |
| 3918454A1 | 12/1989 | Germany |
| 2059135A | 4/1981 | United Kingdom |

OTHER PUBLICATIONS

"Digital Video Recording—Some Experiments and Future Considerations," Morizono et al., SMPTE Journal, Sep. 1980, vol. 89, No. 9, pp. 658–662.

7th International Conference on Video, Audio and Data Recording Mar. 1988, York FB pp. 219–226 Kondo et al. 'Adaptive Dynamic Range Coding Scheme for Future Consumer Digital VTR'.

(List continued on next page.)

*Primary Examiner*—Aristolis P. Psitos
*Assistant Examiner*—Jennifer Pearson Wright
*Attorney, Agent, or Firm*—William S. Frommer; Alvin Sinderbrand

[57] ABSTRACT

A digital VTR is provided with a block segmenting circuit for converting an input digital picture signal into data segmented into blocks of picture elements, an encoding circuit for compressing and encoding the output data of the block segmenting circuit block-by-block, a channel encoding circuit for channel encoding the encoded output data from the encoding circuit, an audio signal encoding circuit for encoding an input digital audio signal, and an additional code generating circuit for generating an additional control code which includes subdata. The encoded picture data from the channel encoding circuit, the encoded audio data output from the audio signal encoding circuit, the additional control code and pilot signal data for tracking are recorded in skewed tracks traced on a magnetic tape by a magnetic head or heads mounted on a rotary drum, with each skewed track having pilot signal data recorded at least adjacent the end portion of the track at which the magnetic head enters into contract with such track, subdata recorded at the other end portion at which the magnetic head leaves the track, and the picture data and the audio data recorded at an intermediate portion of the track, so that both picture data and audio data can be reproduced with high quality while the subdata can be played back with relatively high accuracy.

19 Claims, 11 Drawing Sheets

OTHER PUBLICATIONS

NHK Laboratories Note No. 236, Apr. 1979, Tokyo JP pp. 2–7 Yokoyama et al. "Experimental PCM-VTR" p. 4, Line 6–Line 15 FIG. 4; table 1.

Patent Abstracts of Japan vol. 012, No. 140 (P-696) 28 Apr. 1988 & Jp-A-62 262 208 (Mitsubishi Electric Corp) 14 Nov. 1987.

IEEE Transactions on Consumer Electronics vol. 35, No. 3, Aug. 1989, New York U.S. pp. 450–457, XP000065969 Yamamitsu et al. 'An Experimental Study for a Home-Use Digital VTR'.

SMPTE Journal vol. 96, No. 10, Oct. 1987, Scarsdale N.Y. U.S. pp. 934–943, XP000001306 Engberg et al. 'The Composite Digital Format and Its Applications'.

IEEE Transactions on Consumer Electronics vol. 34, No. 3, Aug. 1988, New York U.S. pp. 588–595, XP000111199 Yamamitsu et al. "An Experimental Study on Bit Rate Reduction and High Density Recording for a Home-Use Digital VTR".

APPARATUS FOR MAGNETICALLY RECORDING DIGITAL DATA

RELATED APPLICATIONS

This application is a Continuation-In-Part of U.S. patent application Ser. No. 07/768,871, filed Oct. 29, 1991, and which is the U.S. National Phase of Iternational Application No. PCT/JP91/00755, filed Jun. 5, 1991, and the disclosure of said application is incorporated herein by reference.

BACKGROUND OF THE INVENTION

1. Field of the Invention

This invention relates to a magnetic recording apparatus for recording digital data such as a digital video signal, a digital audio signal, and subdata on a magnetic tape, and more particularly is directed to the sequence in which such data are recorded in a track on the tape.

2. Description of the Prior Art

A D1 format component type digital VTR and a D2 format composite type digital VTR have been developed for use by broadcasting stations in digitizing color video signals and recording the digitized signals on a recording medium, such as a magnetic tape.

In the D1 format digital VTR, a luminance signal and first and second color difference signals are A/D converted with sampling frequencies of 13.5 MHz and 6.75 MHz, respectively. Thereafter, the signals are suitably processed and then recorded on a tape. Since the ratio of sampling frequencies of the signal components is 4:4:2, this system is usually referred to as the 4:2:2 system.

On the other hand, in the D2 format video digital VTR, a composite video signal is sampled with a signal having a frequency 4 times higher than the frequency fsc of a color subcarrier signal and then A/D converted. Thereafter, the resultant signal is suitably processed and then recorded on a magnetic tape.

Since these known D1 and D2 format digital VTRs are designed for professional use, for example, in broadcasting stations, the attainment of high picture quality is given top priority in the design and construction of such VTRs, and the weight and size of the apparatus are not overly important.

In these known digital VTRs, the digital color video signal, which results from each sample being A/D converted into, for example, 8 bits, is recorded without being substantially compressed. As an example, when the known D1 format digital VTR A/D converts each sample into 8 bits with the frequencies noted above, the data rate representing the color video signal is approximately 216 Mbps (megabits per second). When the data in the horizontal and vertical blanking intervals are removed, the number of effective picture elements of the luminance signal per horizontal interval and the number of effective picture elements of each color difference signal per horizontal interval become 720 and 360, respectively. Since the number of effective scanning lines for each field in the NTSC system (525/60) is 250, the data bit rate Dv can be expressed as follows:

$$Dv = (720 + 360 + 360) \times 8 \times 250 \times 60 = 172.8 \text{ Mbps}$$

Even in the PAL system (625/50), since the number of effective scanning lines for each field is 300 and the number of fields per second is 50, it is obvious that the data bit rate in the PAL system is the same as that in the NTSC system. If the redundant components necessary for error correction and the format with respect to such data are considered the total bit rate of picture data becomes approximately 205.8 Mbps.

Further, the amount of audio data Da is approximately 12.8 Mbps, while the amount of additional data Do, such as, data of a gap, a preamble, and a postamble used in editing, is approximately 6.6 Mbps. Thus, the bit rate of information data to be recorded can be expressed by the following equation:

$$Dt = Dv + Da + Do$$

$$Dt = 172.8 + 12.8 + 6.6 = 192.2 \text{ Mbps.}$$

In order to record such amount of information data, the known D1 format digital VTR employs a segment system having a track pattern comprised of 10 tracks for each field in the NTSC system, or comprised of 12 tracks for each field in the PAL system.

A recording tape with a width of 19 mm is used. There are two types of recording tapes having thicknesses of 13 $\mu$m and 16 $\mu$m, respectively. To house these tapes, there are three types of cassettes, which are respectively characterized as being of the large type, middle type, and small type. The information data is recorded on such tapes in the above mentioned format with the tape area for each bit of data being approximately 20.4 $\mu m^2$/bit, which corresponds to a recording density of 1/20.4 bit/$\mu m^2$. When the recording density is increased, an error tends to take place in the playback output data due to interference between codes or nonlinearity of the electromagnetic conversion system of the head and tape. Heretofore, even if error correction encoding has been performed, the above given value of the recording density has been the limit therefor.

By putting all the above described parameters together, the playback times for the cassettes of various sizes and the two tape thicknesses, when employed in the digital VTR in the D1 format can be tabulated as follows:

| Size/tape thickness | 13 $\mu$m | 16 $\mu$m |
| --- | --- | --- |
| Small | 13 minutes | 11 minutes |
| Middle | 42 minutes | 34 minutes |
| Large | 94 minutes | 76 minutes |

Although the described D1 format digital VTR can provide satisfactorily high picture quality for use in broadcasting stations, even if a large cassette housing a tape with a thickness of 13 $\mu$m is used, the playback time is at most 1.5 hours. Thus, such a VTR is not adequate for consumer or home use in which a playback time at least sufficient for the recording of a telecast movie is required. On the other hand, in VTRs intended for consumer or home use, the $\beta$ system, the VHS system, the 8-mm system, and so forth have been employed. However, in each of these systems for consumer or home use, analog signals have been recorded and reproduced. Although the picture quality of these analog VTRs has been improved to the point where the quality is satisfactory when a video signal is simply recorded and then reproduced for viewing, the picture quality is significantly degraded when the recorded signal is dubbed and copied. Thus, when the recorded signal is dubbed several times, the picture quality will become unacceptable to the viewers.

In order to overcome the foregoing problems, the present applicants have studied the possibilities of providing a digital magnetic recording apparatus in which the amount of information to be recorded is compressed in a manner such that playback distortion is small and the recording density is increased so that, even if a magnetic tape with a narrow width of 8 mm or less is used, data of a long time period can be recorded on a tape having a length that can be readily contained in a cassette of a size not substantially larger than the cassette used with the analog 8-mm system.

Moreover, in a digital VTR, it is necessary to record on the tape a digital audio signal, subdata, a tracking pilot signal, and so forth, as well, as the digital picture signal.

In the D1 format digital VTR, the audio data is recorded at the center of each skewed track, while the time code and control signals, such as, signals employed for tracking, are recorded in a longitudinal track or tracks on the tape. On the other hand, in the D2 format digital VTR, the audio data is recorded at both the ends of each skewed track, while the time code and the control signals, such as, signals used for tracking, are again recorded in a longitudinal track or tracks on the tape, as in the D1 format.

Therefore, in the existing D1 format and D2 format digital VTRs, fixed heads are required for recording and reproducing the tracking signal and or the time code, so that the mechanism becomes complicated and, thereby, the reliability of the tape path may deteriorate.

OBJECTS AND SUMMARY OF THE INVENTION

Accordingly, it is an object of the present invention to provide a digital VTR which does not require fixed heads for recording the time code and/or the control signals employed for tracking or the like.

Another object of the present invention is to provide a digital VTR with which audio data can be post recorded and/or edited.

In accordance with an aspect of this invention, a digital VTR comprises a block segmenting circuit for converting an input digital picture signal into data segmented into blocks each composed of a plurality of picture elements, an encoding circuit for compressing and encoding the output data of the block segmenting circuit block-by-block, a channel encoding circuit for channel encoding the encoded output data from the encoding circuit, an audio signal encoding circuit for encoding an input digital audio signal, and an additional code generating circuit for generating an additional control code; with the picture data output from the channel encoding circuit, the audio data output from the audio signal encoding circuit, and the additional code output from the additional code generating circuit being recorded in skewed tracks traced on a magnetic tape by a magnetic head or heads mounted on a rotary drum; and with each skewed track having a pilot signal for use in tracking recorded at least at one end portion of the track at which the magnetic head enters into contact with such track, subdata recorded at the other end portion at which the magnetic head leaves the track, and the picture data and the audio data recorded at a center portion of the track, so that both picture data and audio data can be reproduced with high quality while the subdata can be played back with relatively high accuracy.

The foregoing arrangement according to this invention is advantageous in that, at the beginning end portion or the head entering side of the skewed track traced on the magnetic tape by a rotary head, the head and the tape cannot be stably contacted. Therefore, it is preferable to record the tracking pilot signal, which is a low frequency signal, in such beginning end portion of the track. Further, the subdata normally contains an ID signal such as a track address, so that it is preferable to record the subdata at the head leaving side of the skewed track where the head and the tape are more stably contacted with each other.

In accordance with another aspect of this invention, a digital VTR, as aforesaid, is characterized in that each skewed track formed on the magnetic tape by a rotary head has separated first and second areas with the picture data and audio data being recorded in the first area, and only the audio data being recorded in the second area, so that, in a post recording mode, the audio data in the second area can be rewritten, and different audio signals can be reproduced from the first and second areas, respectively.

By providing two record areas for the audio signal, error correction or error interpolation can be performed on the basis of the dual recording of the same audio signal. Furthermore, two types of audio signals can be recorded in an after or post recording operation.

The above, and other objects, features and advantages of the invention, will be apparent in the following detailed description of illustrative embodiments thereof when read in connection with the accompanying drawings in which corresponding elements are identified by the same reference numerals in the several views.

DETAILED DESCRIPTION OF A PREFERRED EMBODIMENT OF THE INVENTION

Figure 1:
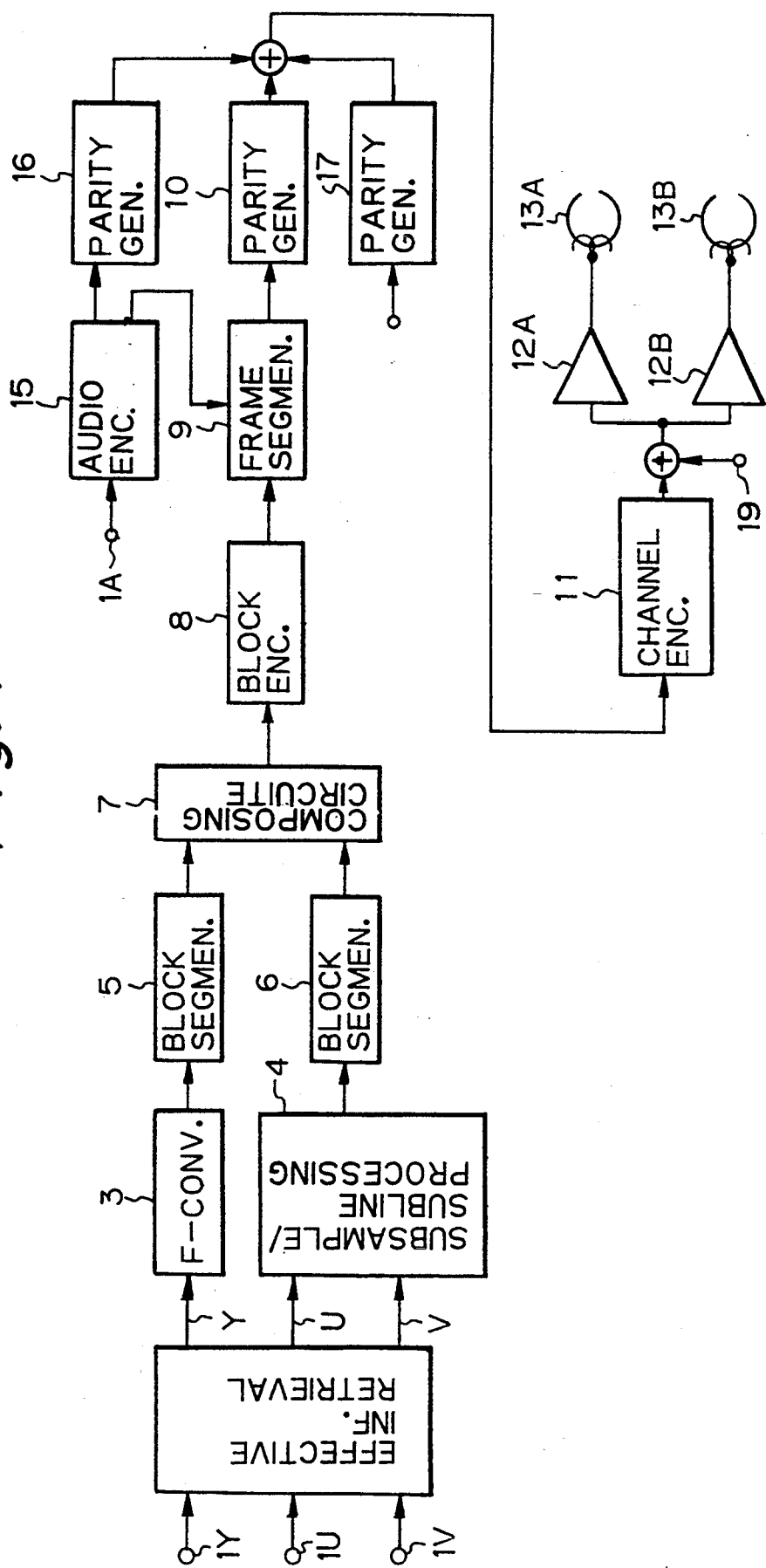
FIG. 1 is a block diagram showing a signal processing portion of a recording circuit in a digital VTR according to an embodiment of the present invention.

First, a signal processing portion of a recording circuit in a digital VTR according to an embodiment of the present invention will be described with reference to FIG. 1 in which a digital luminance signal Y and digital color difference signals U and V, are supplied to input terminals 1Y, 1U, and 1V, respectively, after being formed from three primary color signals R, G, and B output from, for example, a color video camera. In this case, the clock rates of the signals Y, U and V are the same as the frequencies of the component signals in the above described D1 format. In other words, the sampling frequencies are 13.5 MHz and 6.75 MHz for the luminance signal Y and for the color difference signals U and V, respectively, and there are eight bits per sample. Thus, the data rate of the signals sent to the input terminals 1Y, 1U, and 1V is approximately 216 Mbps as was described earlier. An effective information retrieval circuit 2 for removing data from the signals during the blanking intervals and for retrieving only information in the effective area compresses the data to a data rate of approximately 167 Mbps. The luminance signal Y output by the effective information retrieval circuit 2 is sent to a frequency conversion circuit 3 which converts the sampling frequency from 13.5 MHz to ¾ thereof, that is, to 10.125 MHz. A thin-out filter may be used for the frequency conversion circuit 3, so as to prevent reflected distortion from taking place.

The output signal from the frequency conversion circuit 3 is sent to a block segmentation circuit 5 which converts the series luminance data into a sequence of blocks. The block segmentation circuit 5 is provided to condition the data for processing by a block encoding circuit 8 disposed at a later stage of the recording circuit.

Figure 3:
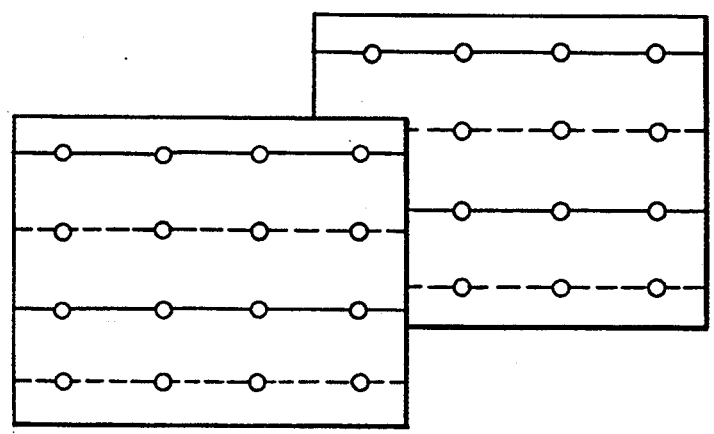
FIG. 3 is a schematic diagram showing an example of a block-by-block encoding.

Reference to FIG. 3 will show a construction of three-dimensional blocks which are used as an encoding unit. By dividing a screen which occupies for example two frames, as shown in FIG. 3, a large number of unit blocks (4 lines×4 picture elements×2 frames) are formed. In FIG. 3, the solid lines represent lines of odd fields, while the dotted lines represent lines of even fields.

Figure 4:
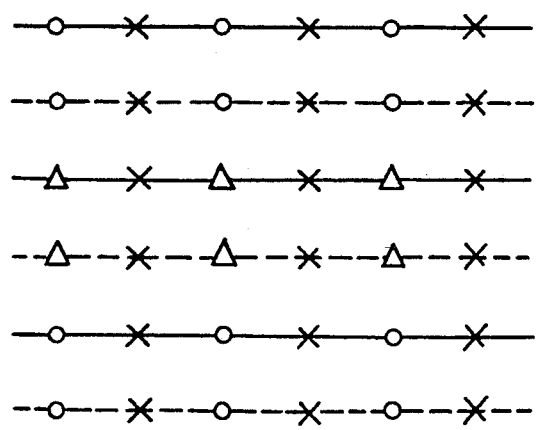
FIG. 4 is a schematic diagram to which reference will be made in describing operation of a subsampling and subline circuit.

Returning to FIG. 1, it will be seen that the two color difference signals U and V output from the effective information retrieval circuit 2, are supplied to a subsampling and subline circuit 4. The subsampling and subline circuit 4 converts the sampling frequency of such signals from 6.75 MHz to one-half thereof, that is, to 3.375 MHz, and then selects the two digital color difference signals one after the other for each line. Thereafter, the subsampling and subline circuit 4 composes the two digital color difference signals into data in one channel and thereby outputs a line sequential digital color difference signal. FIG. 4 shows an arrangement of the picture elements of the signal which are sub-sampled and sublined by the circuit 4. In FIG. 4, "0" represents a sampling picture element of the first color difference signal U; "Δ" represents a sampling picture element of the second color difference signal V; and "X" represents a position of a picture element which is being thinned out by the sampling.

The output line sequential signal from the subsampling and subline circuit 4 is supplied to a block segmentation circuit 6. Similarly to the block segmentation circuit 5, the block segmentation circuit 6 converts scanning or line sequential color difference data of television signals into block sequential data. In other words, the block segmentation circuit 6 converts the color difference data into data in a block arrangement (4 lines×4 picture elements×2 frames).

The output signals of the block segmentation circuits 5 and 6 are sent to a composing circuit 7 which converts into data in one channel the luminance signal and the color difference signals which have been converted into block sequential signals. The output signal of the composing circuit 7 is sent to a block encoding circuit 8 for which, as will be described later in detail, an encoding circuit adaptable to the dynamic range of each block, that is, an ADRC circuit, a DCT or Discrete Cosine Transform circuit, or the like can be used. The output signal from the block encoding circuit is sent to a frame segmentation circuit 9 which converts the signal into data in a frame arrangement or construction. The frame segmentation circuit 9 exchanges between a picture system clock and a record system clock.

A digital audio signal is supplied from an input terminal 1A to an audio encoding circuit 15 which compresses the data amount of the audio signal by differential pulse code modulation (DPCM). The output data from the audio encoding circuit 15 is supplied to the frame segmentation circuit 9 which converts such data into a frame arrangement or construction along with the block encoded picture data. The audio data supplied to the frame segmentation circuit 9 is real time data because it relates to the picture data.

The output signal from the frame segmentation circuit 9 is supplied to a parity generating circuit 10 which generates a parity of an error correction code. The output signal of the parity generation circuit 10 is supplied to a mixing circuit 14. Output signals from parity generation circuits 16 and 17 are also sent to the mixing circuit 14. The parity generation circuit 16 generates a parity of an error correction code for the output data of the audio encoding circuit 15. When audio data is initially recorded, the audio data which is sent to the frame segmentation circuit 9 is the same as that which is sent to the parity generation circuit 16. However, in an after or post recording mode, the audio data sent to the parity generation circuit 16 is not simultaneously applied to the frame segmentation circuit 9. The parity generation circuit 17 performs an error correction encoding process for subdata supplied to an input terminal 1S, as hereinafter further described, and generates a respective parity.

The mixing circuit 14 outputs data in which picture or video data, audio data, and subdata are inserted at particular positions of a segment, as hereinafter further described. The output signal from the mixing circuit 14 is supplied to a channel encoder 11 which performs channel encoding so that the low band of the data to be recorded is decreased. The output signal of the channel encoder 11 is supplied to a mixing circuit 18 which also receives a pilot signal for ATF (Automatic Track Following Control) from an input terminal 19. The pilot signal is a low frequency signal which can be separated from the recorded data. The output signal of the mixing circuit 18 is supplied through respective recording amplifiers 12A and 12B and rotary transformers (not shown) to rotary magnetic heads 13A and 13B for recording on the magnetic tape.

With the above described signal processing portion of the recording circuit, by removing data during the blanking intervals, the data rate is decreased to approximately 167 Mbps from the input data rate of 216 Mbps. In addition, with the frequency conversion and the sub-sample and sub-line process, the resultant data rate is decreased to 84 Mbps. After the resultant data is compressed and encoded by the block encoding circuit 8, the data rate is compressed to approximately 25 Mbps. Thereafter, by adding additional information, such as, a parity and an audio signal, to the resultant compressed data, the bit rate of the data to be recorded amounts to approximately 31.5 Mbps.

Figure 2:
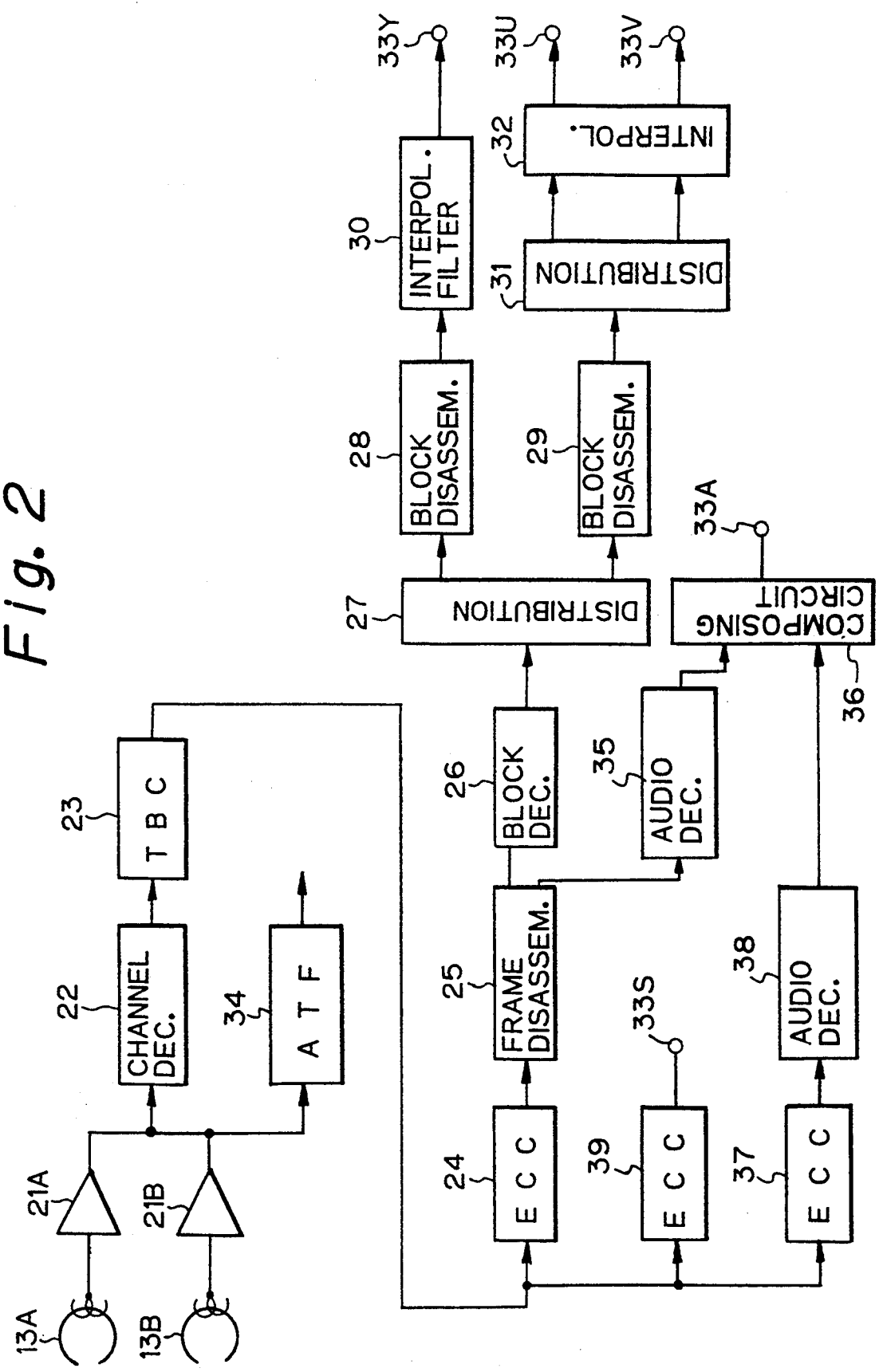
FIG. 2 is a block diagram showing a signal processing portion of a playback circuit in the digital VTR according to the invention.

The playback circuit of a digital VTR according to an embodiment of this invention will now be described with reference to FIG. 2, in which reproduced data from the magnetic heads 13A and 13B are supplied through respective rotary transformers (not shown) and playback amplifiers 21A and 21B to a channel decoder 22 and an ATF circuit 34. The channel decoder 22 demodulates channel encoded data, and the resultant output signal is sent to a TBC (time base correction) circuit 23 for removing time base fluctuating components from the reproduced or playback signal. The ATF circuit 34 generates a tracking error signal in accordance with the level of a beat component of a pilot signal which has been reproduced. The tracking error signal is, for example, supplied to a phase servo circuit of a capstan servo. The operation of the ATF is basically the same as that used in the conventional 8-mm VTR.

The playback data which is output from the TBC circuit 23 is supplied to error correction circuits (ECC) 24, 37 and 39 which use an error correction code to correct and modify errors. More particularly, the ECC circuit 24 corrects and modifies errors in picture data, the ECC circuit 37 corrects and modifies errors in audio data recorded in an audio dedicated area, and the ECC circuit 39 corrects errors in subdata. The output signal of the ECC circuit 37 is supplied to an audio decoding circuit 38 which decodes the audio signal which has been compressed and encoded. The decoded data from the audio decoding circuit 38 is applied to a composing circuit 36. The reproduced subdata is retrieved from an output terminal 33S of the ECC circuit 39, and supplied therefrom to a system controller (not shown) for controlling all of the operations of the VTR.

The output signal of the ECC circuit 24 is supplied to a frame disassembling circuit 25 which separates each component of block encoded picture data and exchanges between the recording system clock and the picture system clock. The data separated in the frame disassembling circuit 25 are sent to a block decoding circuit 26 which decodes data in accordance with the original data for each block. The frame disassembling circuit 25 also separates audio data from the input signal, and the separated audio data is sent to an audio decoding circuit 35 which retrieves the original audio data. The decoded audio data is sent to the composing circuit 36 which switches between the two audio signals or composes them in a close fade.

The decoded picture data which is output from the block decoding circuit 26 is applied to a distribution circuit 27.

The distribution circuit 27 separates a luminance signal and color difference signals from the decoded data. The luminance signal and the color difference signals are sent to respective block disassembling circuits 28 and 29. The block disassembling circuits 28 and 29 convert the block sequence signals into raster scanning sequence signals, that is, function in opposition to the block segmentation circuits 5 and 6 in the recording circuit.

The decoded luminance signal which is output from the block disassembling circuit 28 is sent to an interpolation filter 30, which converts the sampling rate of the luminance signal from 3 fs to 4 fs (where 4 fs=13.5 MHz). The digital luminance signal Y which is output from the interpolation filter 30 is derived at an output terminal 33Y.

The digital color difference signals which are output from the block disassembling circuit 29 are sent to a distribution circuit 31 which separates digital color difference signals U and V from the line sequential digital color difference signals. The separated digital color difference signals U and V output from the distribution circuit 31 are supplied to an interpolation circuit 32 which interpolates, from the decoded picture element data, the line and picture element data which have been thinned out. The interpolation circuit 32 outputs digital color difference signals U and V with a sampling rate 4 fs, and which are derived at output terminals 33U and 33V, respectively.

The block encoding circuit 8 in the recording circuit of FIG. 1, may be an ADRC (Adaptive Dynamic Range Coding) encoder, which generally detects the maximum value MAX and the minimum value MIN of data representing a plurality of picture elements contained in each block and then detects a dynamic range DR of the block therefrom. Thereafter, the ADRC encoder encodes the data in accordance with the dynamic range and then requantizes the data with bits which are smaller in number than the data bits representing the original picture elements. As an alternative to the foregoing, the block encoding circuit 8 may first DCT (Discrete Cosine Transform) the picture element data of each block, and then quantize coefficient data obtained by the DCT process. Thereafter, the quantized data is compressed by the run-length Huffman encoding process.

Figure 5:
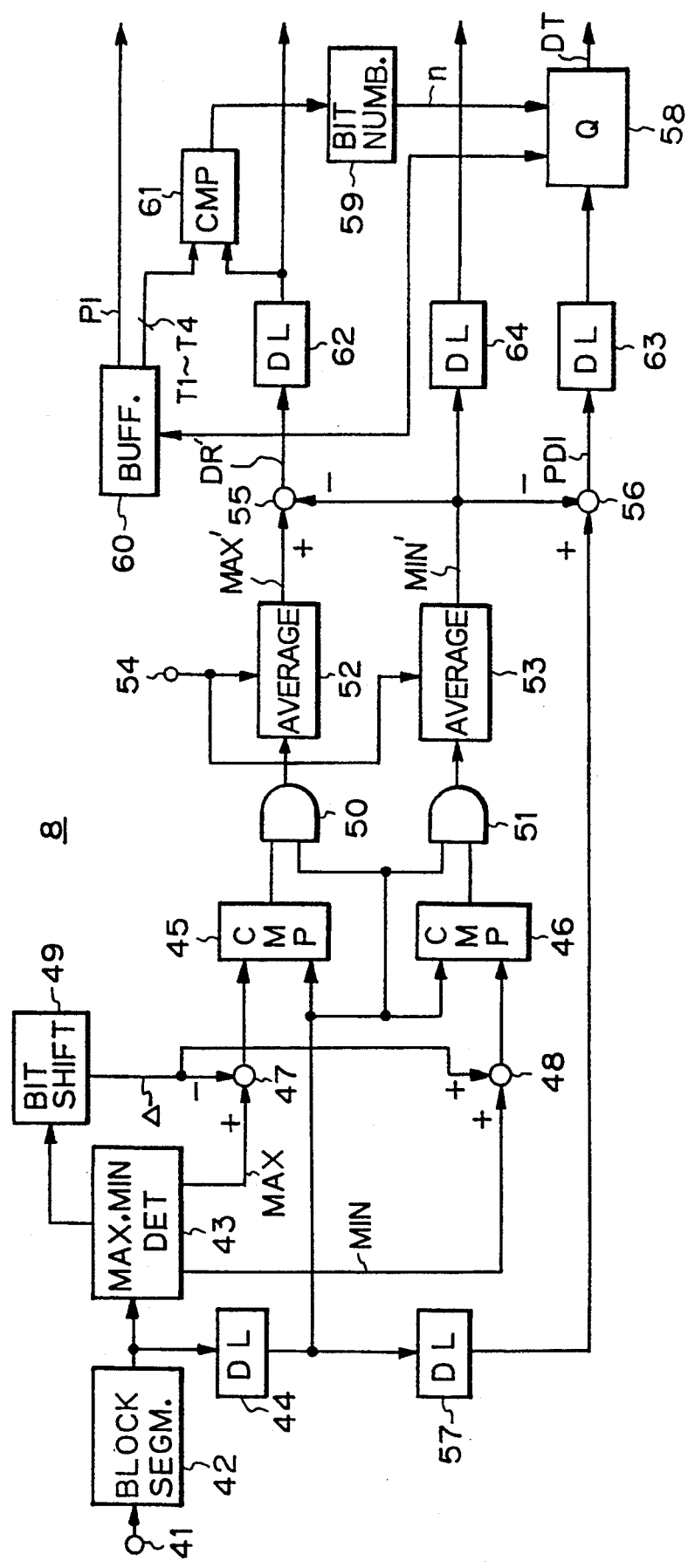
FIG. 5 is a block diagram showing an example of a block encoding circuit that may be included in the recording circuit of FIG. 1.

Referring now to FIG. 5, it will be seen that, in an example of the encoding circuit 8 using an ADRC encoder, and with which picture quality is not degraded by multiple dubbing operations, a digital luminance signal (or a digital color difference signal) having each sample quantized to 8 bits is received from the composing circuit 7 at an input terminal 41 and applied to a block segmentation circuit 42 which corresponds to the circuit 5 or 6 on FIG. 1.

The block segmentation data from the circuit 42 is sent to a maximum value and minimum value detection circuit 43 and a delay circuit 44. The maximum value and minimum value detection circuit 43 detects the minimum value MIN and the maximum value MAX for each block. The delay circuit 44 delays the input data for a time period equivalent to that necessary for detecting the maximum value and the minimum value. The picture element data which is output from delay circuit 44 is applied to comparison circuits 45 and 46.

The maximum value MAX from the maximum value and minimum value detection circuit 43 is applied to one input of a subtraction circuit 47. On the other hand, the minimum value MIN from the maximum value and minimum value detection circuit 43 is applied to one input of an addition circuit 48. The value $\Delta$ of one quantized step width ($\Delta = 1/16$ DR where non-edge matching quantization is performed with a fixed length of 4 bits) is supplied from a bit shift circuit 49 to the other inputs of subtraction circuit 47 and addition circuit 48. In the bit shift circuit 49, the dynamic range DR is shifted by 4 bits so as to perform a deviation of (1/16). The subtraction circuit 47 provides at its output a threshold value of (MAX $-\Delta$). On the other hand, the addition circuit 48 provides at its output a threshold value of (MIN $+\Delta$). The threshold values which are output from the subtraction circuit 47 and the addition circuit 48 are applied to the comparison circuits 45 and 46, respectively, for comparison therein with the delayed picture element data from circuit 44.

The value $\Delta$ which determines the threshold values may be a fixed value equivalent to a noise level rather than the quantizing step width.

The output signal of the comparison circuit 45 is applied to one input of an AND gate 50. Similarly, the output signal of the comparison circuit 46 is applied to one input of an AND gate 51. The output of the delay circuit 44 is also applied to the other inputs of the AND gates 50 and 51. The output signal of the comparison circuit 45 becomes high when the level of the input data is larger than that of the threshold value. Thus, the picture element data of the input data which are in the maximum level range of (MAX to MAX $-\Delta$) are output from the AND gate 50. On the other hand, the output signal of the comparison circuit 46 becomes high when the level of the input data is smaller than that of the threshold value. Thus, the picture element data of the input data which are in the minimum level range of (MIN to MIN $+\Delta$) are output from the AND gate 51.

The output signal of the AND gate 50 is supplied to an averaging circuit 42. Similarly, the output signal of the AND gate 51 is supplied to an averaging circuit 53. These averaging circuits 52 and 53 calculate average values for each block. A reset signal with a block interval is applied from a terminal 54 to the averaging circuits 52 and 53. The averaging circuit 52 outputs an average value MAX' of picture element data in the maximum level range of (MAX to MAX $-\Delta$). On the other hand, the averaging circuit 53 outputs an average value MIN' of the picture element data in the minimum level range of (MIN to MIN $+\Delta$). A subtraction circuit 55 subtracts the average value MIN' from the average value MAX' and outputs an adjusted dynamic range DR'.

The average value MIN' is also applied to a subtraction circuit 56. The subtraction circuit 56 subtracts the average value MIN' from input data supplied to circuit 56 through a delay circuit 57. The subtraction circuit 56 outputs data PD1 from which the minimum value is removed. The data PD1 and the adjusted dynamic range DR' are applied to a quantizing circuit 58. In the embodiment being described the ADRC with variable length is used, with the number of bits assigned for quantization being 0 bit (no code signal transmission), 1 bit, 2 bits, 3 bits, or 4 bits, and with an edge matching quantizing operation being performed. The number n of bits assigned is determined for each block by a bit number determination circuit 59. Data representing the bit number n is sent to the quantizing circuit 58.

In the ADRC with variable length encoding, for a block where the dynamic range DR' is small the bit number n is decreased. Conversely, for a block where the dynamic range DR' is large, the bit number n is increased. As a result, the encoding operation can be effectively performed. In other words, when a threshold value for determining the bit number n is T1 to T4 (where T1<T2<T3<T4), for a block having its DR'<T1, the code signal is not transmitted, but only information of the dynamic range DR' is transmitted. For a block of T1<=DR'<T2, (n=1) is assigned; for a block of T2<=DR'<T3, (n=2) is assigned; for a block of T3<=DR'<T4, (n=3) is assigned; and for a block of DR'>=T4, (n=4) is assigned.

In the ADRC with variable length, by varying the threshold values T1 to T4, the amount of information which is generated can be controlled, that is, the information can be buffered. Thus, even for a transmission path, such as a digital VTR according to the present invention, where the amount of information which is generated has to be set to a particular value, the ADRC with variable length can be applied.

In FIG. 5, a buffering circuit 60 is provided for determining the threshold values T1 to T4 so as to set the amount of information which is generated to a particular value. The buffering circuit 60 contains a plurality of sets of threshold values (T1, T2, T3, T4), for example, 32 sets. The sets of the threshold values are identified by a parameter code Pi (where i=0, 1, 2, ..., 31). As the number i of the parameter code Pi becomes large, the amount of information which is generated is linearly decreased. However, as the amount of information which is generated decreases, the quality of the picture being recorded is degraded.

The threshold values T1 to T4 which are output from the buffering circuit 60 are applied to a comparison circuit 61. The dynamic range DR' is also applied to the comparison circuit 61 through a delay circuit 62. The delay circuit 62 delays the dynamic range DR' for a time period necessary for the buffering circuit 60 to determine a set of the threshold values. The comparison circuit 61 compares the dynamic range DR' of the block with each threshold value. The compared output is sent to the bit number determination circuit 59 and, on the basis thereof, the circuit 59 determines the number of bits to be assigned for the block. The quantizing circuit 58 converts the data PDI, from which the minimum value has been removed, into a code signal DT by an edge matching quantizing operation with the dynamic range DR' and the bit number n being assigned. The quantizing circuit 58 may be in the form of a ROM.

The dynamic range DR' and the average value MIN' are passed through respective delay circuits 62 and 64 before being output. In addition, a parameter code Pi, which represents the code signal DT and the set of threshold values provided by the buffering circuit 60, is output from the circuit 60. In the embodiment of the invention being described, since a signal which has been quantized in a non-edge matching operation is requantized in an edge matching operation in accordance with information concerning the dynamic range, the degradation of pictures being dubbed is small.

Practical arrangements of the channel encoder 11 (FIG. 1A or 1B) and the channel decoder 22 (FIG. 2A or 2B) may be as disclosed in Japanese Patent Application No. HEI 1-143,491, having a common assignee herewith, and as now further described with reference to FIGS. 6 and 7, respectively.

Figure 6:
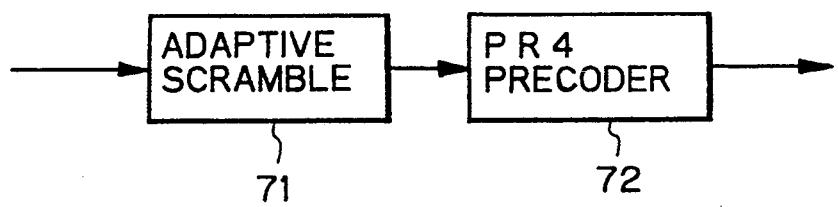
FIG. 6 is a block diagram showing an example of a channel encoder that may be included in the recording circuit of FIG. 1.
Figure 7:
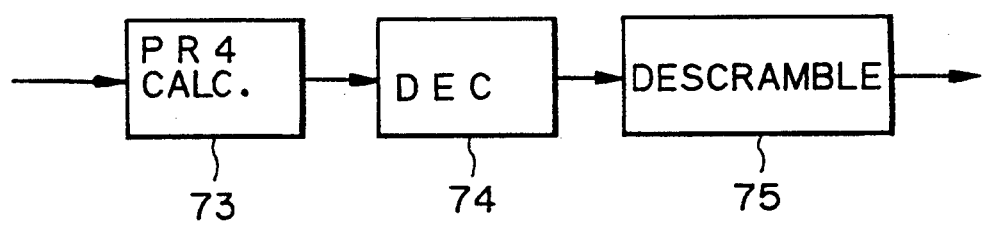
FIG. 7 is a block diagram showing an example of a channel decoder that may be included in the playback circuit of FIG. 2.

More particularly, in the channel encoder 11 of FIG. 6, the output of the parity generation circuit 10 is supplied to an adaptive type scramble circuit 71. In fact, a plurality of M system scramble circuits are provided, with one of such circuits being selected so that the high frequency component and the DC component are smallest therein with respect to the input signal. The output of the scramble circuit 71 is supplied to a partial response class 4 detection type precoder 72.

The precoder 72 calculates $1/1-D^2$ (where D is a unit delay or delay operator). The precoder output is supplied to the magnetic heads 13A and 13B through the record amplifiers 12A and 12B, respectively, for recording on the tape. The reproduced signals output from the heads 13A and 13B are amplified by the playback amplifiers 21A and 21B prior to being supplied to a partial response class 4 calculation process circuit 73 in the channel decoder 22 ( FIG. 7). The circuit 73 performs the calculation $1+D$ on the reproduced output signals and, the result of such calculation, is supplied to a Viterbi decoding circuit 74 which decodes the output of the calculation process circuit 73 in accordance with the Viterbi algorithm.

As disclosed in "Analog Viterbi Decoding for High Speed Digital Satellite Channels", A. S. Acampora et al, *IEEE Transactions on Communications*, Vol. Com. 26, No. 10, October 1978, pages 1463-1470; and in "The Viterbi Algorithm", G. D. Forney, Jr., Proceedings of the IEEE, Vol. 61, No. 3, March 1973, pages 268-278, the Viterbi decoding circuit 74 utilizes likelihood of correlation between data input successively thereto for detecting transit of the data and decodes the data on the basis of the detected result. Since the relationship $(1-D^2)$ of the reproduced signal relative to the signal used for recording (hereinafter referred to as the "recording signal") is utilized to decode the recording signal from the reproduced signal and then the digital video signal is decoded by the circuit 74 on the basis of the decoded data, the bit error rate of the decoded data can be reduced as compared with a standard decoding circuit which decodes data with reference to the signal level. Therefore, the decoded data output by the Viterbi decoding circuit 74 has high noise resistance. More specifically, by reason of the Viterbi decoding circuit 74 in the channel decoder 22, the reproduced C/N (carrier/noise) ratio is improved by 3 dB in respect to that achieved when decoding bit-by-bit.

Figure 8A:
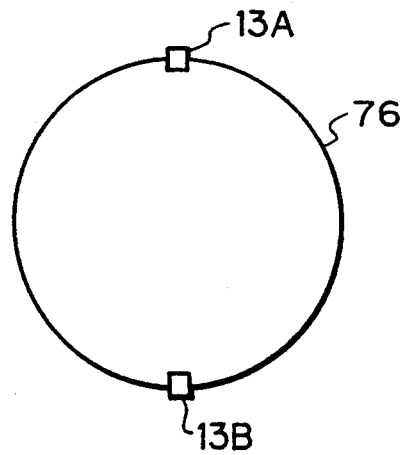
FIGS. 8A and 8B are schematic diagrams illustrating different locations of rotary heads on a tape guiding drum of a VTR.
Figure 8B:
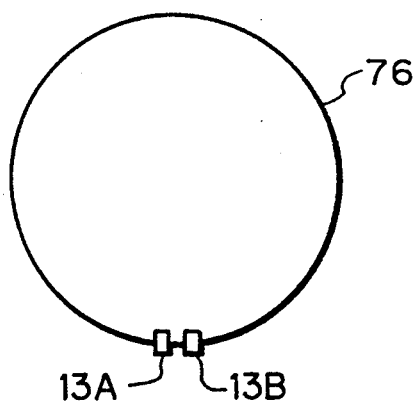

As shown in FIG. 8A, the magnetic heads 13A and 13B may be mounted in diametrically opposed positions on a rotation drum 76. However, as shown in FIG. 8B, the magnetic heads 13A and 13B are desirably mounted on the drum 76 adjacent each other in a unified construction. A magnetic tape (not shown on either FIG. 8A or 8B) is wrapped obliquely on the peripheral surface of the drum 76 with a winding angle of approximately 180°. With the head locations shown in FIG. 8A, the magnetic heads 13A and 13B are alternately contacted with the magnetic tape. On the other hand, with the heads located as shown in FIG. 8B, both of the magnetic heads 13A and 13B scan the magnetic tape at the same time.

Figure 9A:
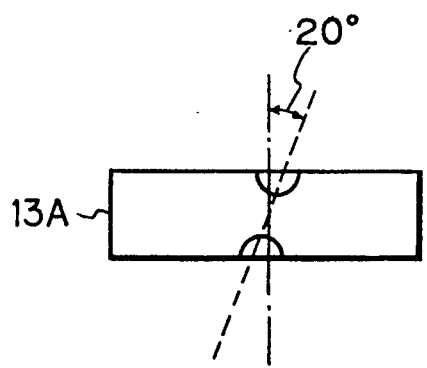
FIG. 9 is a schematic diagram illustrating different azimuths of the heads.
Figure 9B:
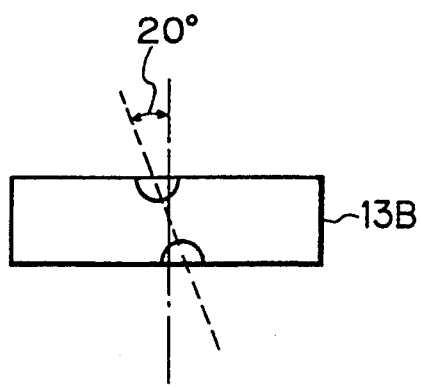
Figure 10:
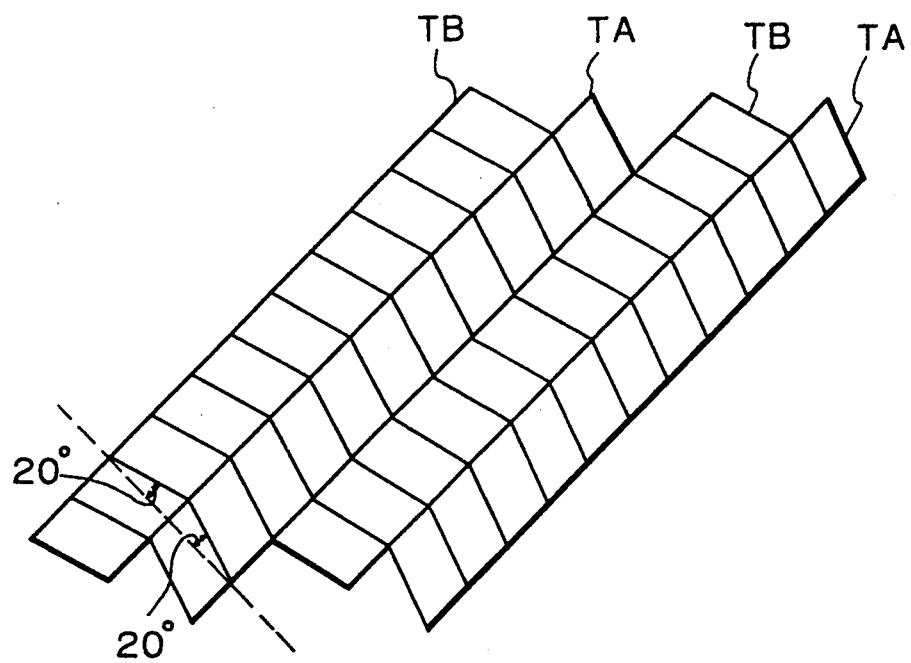
FIG. 10 is a schematic diagram illustrating a recording pattern formed by the heads with different azimuths.

The directions of the gaps of the magnetic heads 13A and 13B differ from each other, that is, the heads 13A and 13B have different azimuth angles. For example, as shown in FIGS. 9A and 9B, azimuth angles of $+20°$ and $-20°$ are given to the magnetic heads 13A and 13B, respectively. By reason of the difference of the azimuth angles, a record pattern is formed on the magnetic tape, as shown in FIG. 10, in which adjacent tracks TA and TB on the magnetic tape are formed by the respective magnetic heads 13A and 13B, which have different azimuth angles. Thus, when the magnetic tape is played back or reproduced, due to an azimuth loss or attenuation, the amount of cross talk between adjacent tracks can be decreased.

Figure 11A:
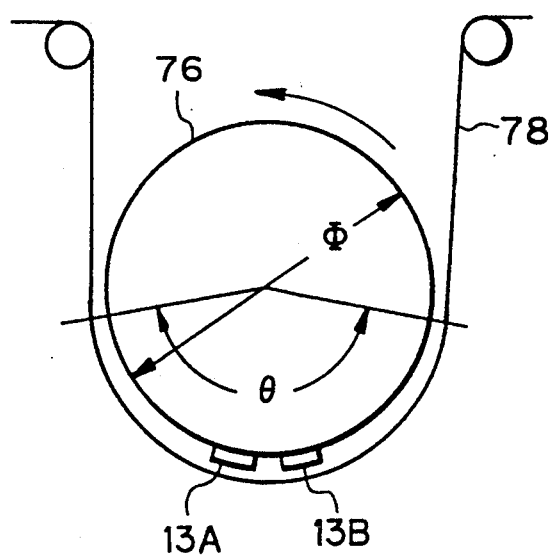
FIGS. 11A and 11B respectively are a top view and a side view showing the wrapping of a tape about a head drum assembly in a digital VTR according to this invention.
Figure 11B:
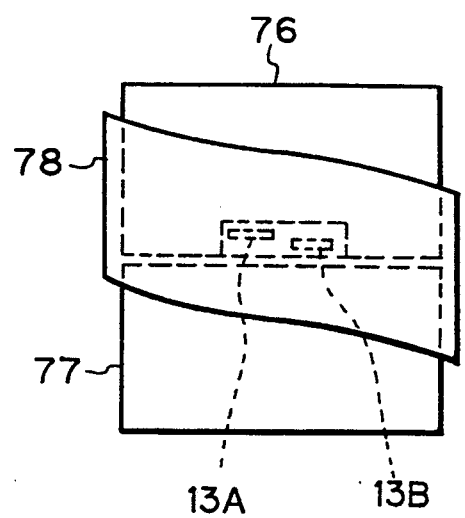

FIGS. 11A and 11b show a practical arrangement in which the magnetic heads 13A and 13B are adjacent each other, as in FIG. 8B and included in a unified structure to provide a so-called double azimuth head. By way of example, the unified magnetic heads 13A and 13B are shown to be mounted on an upper drum 76 which is rotated at a high speed of 150 rps for the NTSC system, while a lower drum 77 is fixed. Therefore, the unified heads 13A and 13B effect $2\frac{1}{2}$ revolutions with the upper drum 76 for each NTSC field so that each field is recorded in five tracks. In other words, each field is divided into five segments recorded in respective tracks on the magnetic tape. By using this segment system, the length of the tracks can be decreased and, as a result, the track linearity error can be decreased. For example, the winding angle $\Theta$ of the magnetic tape 78 on the drum assembly 76-77 is desirably set to be less than 180°, for example, approximately 166° and the drum diameter $\phi$ is desirably determined to be less than 25 mm, for example, 16.5 mm.

Figure 12A:
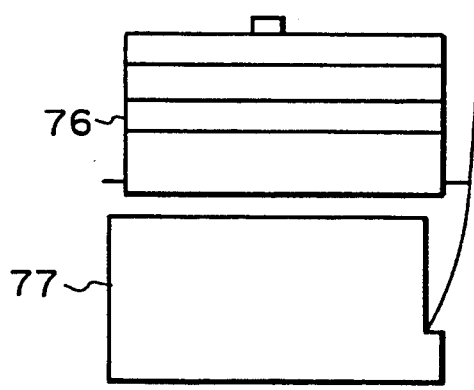
FIGS. 12A and 12B are schematic diagrams to which reference will be made in describing how eccentricity of the head drum results in vibration and non-linearity of the tape.
Figure 12B:
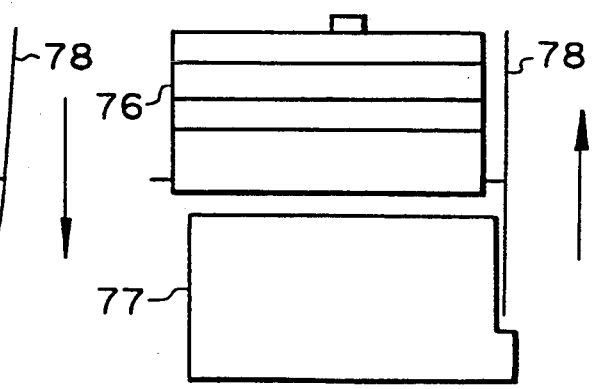

By using the double azimuth head, simultaneous recording is performed. Normally, due to eccentricity or the like of the rotating upper drum 76 relative to the fixed lower drum 77, the magnetic tape 78 vibrates and thereby a track linearity error takes place. As shown in FIGS. 12A and 12B, if the heads are diametrically opposed, the eccentricity of the rotary upper drum 76 may urge the tape 78 downwardly when one of the heads, for example, the head 13A, traces a track on the tape (FIG. 12A), whereas, the tape 78 is urged upwardly when the other head 13B traces a track on the tape (FIG. 12B). By reason of the foregoing, adjacent tracks will be oppositely bowed and track linearity is substantially degraded. On the other hand, when the magnetic heads 13A and 13B are unified so as to substantially simultaneously scan respective tracks on the tape, any eccentricity of the rotary upper drum 76 similarly influences the linearity of the tracks scanned by both heads so that the linearity error is relatively reduced.. Moreover, the distance between the heads 13A and 13B is relatively small when the heads are unified, as in the so-called double azimuth head, so that the paired heads can be more accurately adjusted then when the heads are diametrically opposed.

By using the above described arrangement of the unified heads 13A and 13B simultaneously tracing respective tracks on the tape which has a wrap angle Θ of less than 180° about a relatively small diameter drum, tracks with a narrow width can be recorded and played back.

The tape used in the magnetic recording apparatus embodying this invention is desirably produced as described below so as to contribute to the attainment of the desired high recording density:

A solution containing an emulsion whose principal component is an acrylic acid latex is coated on a base film composed of a 7 $\mu$m thick polyethylene phthalate (PET). Thereafter, the base material is dried and thereby only fine projections made of the emulsion particles are formed. As a result, the surface roughness of the base material, measured as the center line average height, Ra, is about 0.0015 $\mu$m and the density of the fine projections is approximately 5,000,000 particles/mm$^2$.

Figure 13:
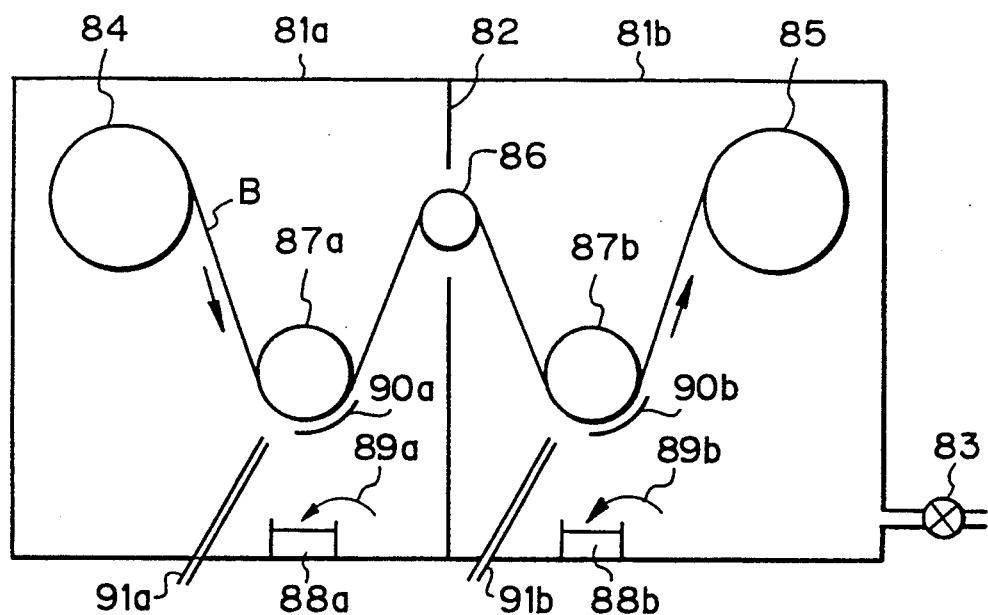
FIG. 13 is a schematic diagram illustrating a method of producing a desirable magnetic tape for use with the digital VTR according to this invention.

Thereafter, by using a vacuum deposition unit shown in FIG. 13, a magnetic layer whose principal component is cobalt (Co) is formed on the base material in an oxygen atmosphere by the so-called slant-deposition method.

More particularly, the vacuum deposition unit of FIG. 13 is shown to include two communicating vacuum chambers 81a and 81b with a partition 82 therebetween, and with a vacuum exhaust valve 83 connected with the chamber 81b and through which both chambers 81a and 81b can be evacuated. A supply roll 84 of the base material B for the magnetic tape is rotatably mounted within the chamber 81a, and a take-up roll 85 on which the completed magnetic tape material is wound is rotatably mounted within the chamber 81b. A guide roller 86 is situated in an opening in the partition 82 approximately at the same level as the rolls 84 and 85, and cylindrical cooling cans 87a and 87b are rotatably mounted within the chambers 81a and 81b, respectively, at levels substantially below that of the guide roller 86 so that the base material B being unwound from the supply roll 84 is led downwardly therefrom under the cooling can 87a, then over the guide roller 86 and under the cooling can 87b prior to being rewound on the take-up roll 85. Evaporation sources of cobalt 88a and 88b which, for example, may be ingots of 100% cobalt, are provided in the chambers 81a and 81b respectively, and are heated by electron beams indicated schematically at 89a and 89b. Insulating shields 90a and 90b extend below the cooling cans 87a and 87b, respectively, for restricting the incident angles at which cobalt evaporated from the sources 88a and 88b can impinge on the base material B running under the cooling cans 87a and 87b. Finally, the chambers 81a and 81b are provided with oxygen gas supply pipes 91a and 91b for directing flows of oxygen against the surface of the base material B at areas thereof where evaporated cobalt is being deposited on the base material.

In the above-described vacuum deposition unit, as the web of base material B travels therethrough from the supply roll 84 past the cooling can 87a, the guide roller 86 and the cooling can 87b to the take-up roll 85, two cobalt (Co) layers forming a magnetic coating are deposited at an angle to the base material, that is, by the slant deposition method, in an oxygen atmosphere.

The conditions under which such vacuum deposition is effected, are as follows:

The vacuum chambers 81a and 81b are maintained at a vacuum of $1 \times 10^{3^{14}}$ Torr., while the pipes 91a and 91b introduce oxygen at a rate of 250 cc/min. into the vacuum chambers. The shields 90a and 90b are arranged so that the incident angles of the evaporated cobalt relative to the base material B are between 45° and 90°. The cobalt layer deposited on the base material at each of the cooling cans 87a and 87b is provided with a thickness of 1000 angstrom units, so that the total thickness of the magnetic layer formed on the base material is 2000 angstrom units.

After the magnetic layer composed of two cobalt layers has been formed on the web of base material B, the back or under side of the base material is coated with a uniform mixture of carbon and epoxy resin binder, and the cobalt magnetic layer is top coated with a perfluoro-polyether, as a lubricant. Finally, the coated web of base material B is cut into strips having widths of 8 mm so as to produce the desired magnetic tapes.

The magnetic tape produced as described above, has been found to have the following characteristics:
a residual magnetic flux density (Br) of 4,150 G;
a coercive force Hc of about 1690 Oe;
a rectangular ratio Rs of 79%;
and a surface roughness with a center line average height Ra as small as 0.0015 $\mu$m, which is due to the very low surface roughness of the base material B.

Although surface roughnesses are usually measured in accordance with JIS B 0601, the above noted surface roughness was measured under the following conditions:

measuring instrument: Talystep (from Rank/Taylor, Inc.)
stylus diameter: 0.2$\times$0.2 $\mu$m (rectangular stylus)
stylus pressure: 2 mg
high-pass filter: 0.33 Hz.

Figure 14:
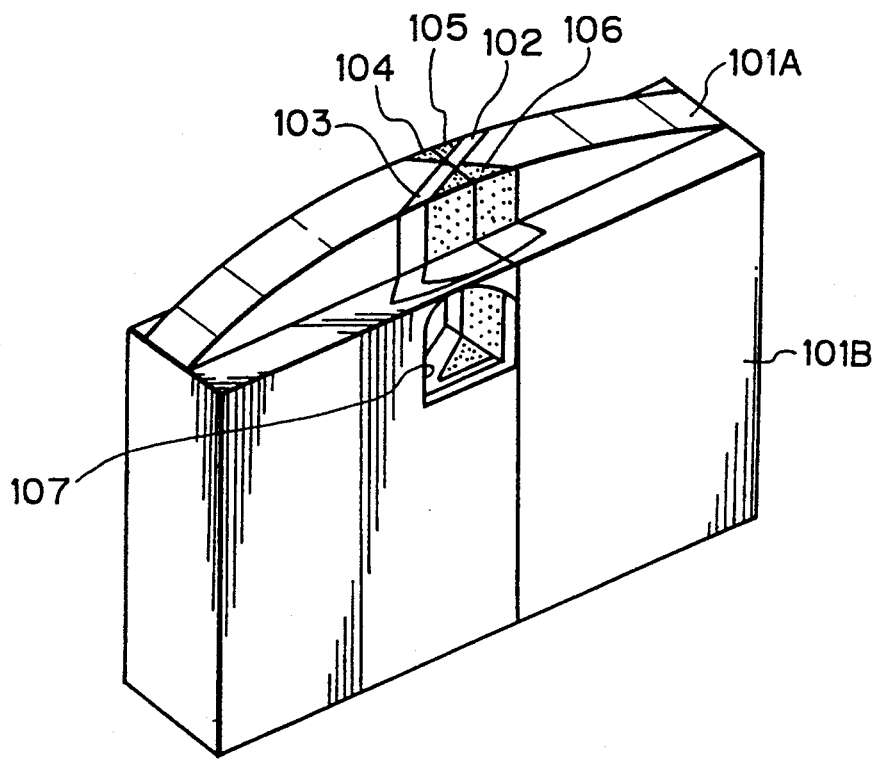
FIG. 14 is a perspective view showing an example of a preferred construction of a magnetic head for use in a digital VTR according to this invention.

Referring now to FIG. 14, it will be seen that a magnetic head desirably used in a magnetic recording apparatus embodying the present invention has monocrystal Mn—Zn ferrite cores 101A and 101B on which Fe-Ga-Si-Ru soft magnetic layers 102 and 103 are formed, by sputtering, for forming a gap 104 therebetween. Both sides of the gap 104, in the direction of the track width, are filled with glass, as at 105 and 106, to limit the effective gap length to 0.20 $\mu$m, and to limit the track width to approximately 4 $\mu$m. A winding hole 107 is provided for receiving a recording coil (not shown).

Since the magnetic head of FIG. 14 provides the Fe-Ga-Si-Ru soft magnetic layers 102 and 103 having a saturation magnetic flux density Bs of 14.5 kG in the vicinity of the gap 104, it is possible for the magnetic head to record data on a magnetic tape of high coercive force without causing magnetic saturation of the head.

By using the (ME) metal evaporated tape and the magnetic head as described above, a recorded bit area of 1.25 $\mu$m$^2$/bit or less can be achieved, so as to obtain an areal recording density of 0.8 bits/$\mu$m$^2$. In other words, the described ME tape and magnetic head make it possible to record a signal with the shortest wavelength of 0.5 $\mu$m on a track having a width of 5 $\mu$m so that the bit area of 1.25 $\mu$m$^2$/bit can be achieved while minimizing the deterioration of the C/N ratio of the reproduced output that otherwise results as the recording wavelength and track width are reduced.

In 1988, the assignee of this application produced an experimental consumer digital VTR which incorporated an ADRC bit reduction scheme, scrambled NRZ coding, a class IV partial response (PR4) detection scheme, and a modified 8 mm video transport mechanism used with ME tape. With a rotary drum having a diameter of 40 mm and a rotation speed of 60 rps, and using a track pitch of 15 μm at the wavelength of 0.5 μm, a raw bit error rate of $4 \times 10^{-5}$ and a C/N of 51 dB (with a resolution bandwidth of 30 KHz) at the half-Nyquist frequency were obtained. When such experimental consumer digital VTR was used with a track width of 5 μm, the C/N obtained was only approximately 44 dB and the picture quality was correspondingly degraded. However, the various features described above in respect to the apparatus for magnetically recording digital data in accordance with this invention, and in respect to the ME tape for use therewith, serve to compensate for the reduction of the C/N by 7 dB, that is, make it possible to obtain a C/N of 51 dB with a track pitch of 5 μm.

In connection with the foregoing, it is known that an increase in the space between the tape and the magnetic head recording or reproducing a signal on the tape causes the signal output level to decrease. Further, it is known that the space between the tape and the magnetic head depends on the flatness of the tape. In the case of a tape of the coated-type, the flatness of the tape depends on the coating material that is used, whereas, in the case of a vacuum deposited tape, such as, an ME tape, the flatness of the tape surface depends on the smoothness of the base material on which the metal is vacuum deposited. It has been determined that, when the surface of the base film is made as flat as possible, for example, as described above the C/N is increased by 1 dB. Furthermore, by effecting the vacuum deposition of cobalt on such base material or film in the manner described above, with reference to FIG. 13, the C/N ratio is further improved by 3 dB, as compared with the tape used in the experimental consumer digital VTR produced in 1988. Further, by using a Viterbi channel decoding scheme, as described above, there is realized a further increase of 3 dB in the C/N ratio over the bit-by-bit decoding scheme employed in the experimental apparatus.

As a result, the deterioration of 7 dB in the C/N ratio associated with a reduction of the track pitch to 5 μm is fully compensated so that, with a recording density resulting in a bit area of 1.25 $\mu m^2$/bit, the described embodiment of this invention makes it possible to achieve a raw bit error rate of $4 \times 10^{-5}$, that is, a raw bit error rate equivalent to that achieved by the experimental apparatus of 1988 with a track pitch of 15 μm. In connection with the foregoing, it is to be noted that the raw bit error rate, that is, the bit error rate prior to correction, needs to be $10^{-4}$ or less in order to ensure that the errors will be contained within a correctable amount when error correction codes with a redundancy of about 20% are employed.

Figure 15A:
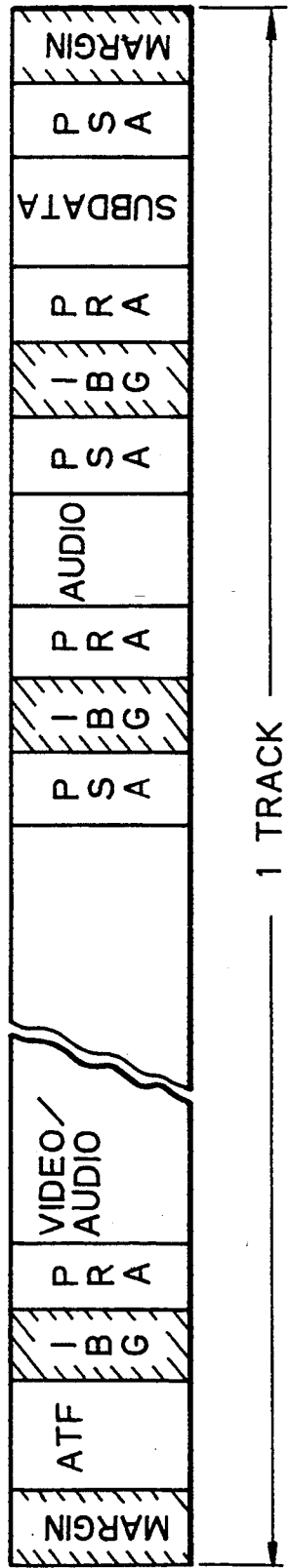
FIG. 15A is a schematic diagram showing a data sequence recorded in one track according to an embodiment of this invention.

Referring now to FIG. 15A which shows the sequence of data recorded in one track or segment on the tape in accordance with one embodiment of the present invention, it is to be understood that the left hand end of the illustrated track is the head entering end or side, that is, the end portion of the track at which a rotary magnetic head enters into contact with the tape, while the right hand end of the illustrated track is the head leaving side, that is, the end portion of the track at which the rotary magnetic head moves out of contact with the tape. At the head entering end of the track, there is a margin or IBG (Inter Block Gap) where no data is recorded. The margin at the head entering end of the track is followed by an area in which an ATF pilot signal is recorded for use in automatic track following during playback. The area containing the ATF pilot signal at the head entering end portion of the track is followed by an Inter Block Gap IBG where no data is recorded, and such gap is, in turn, followed by a relatively long area at which the encoded video data and audio data are recorded. The area for recording of the encoded video data and audio data is immediately preceded and followed by a preamble PRA and a postamble PSA, respectively, at which there are recorded, for example, a pulse signal with the same frequency as the bit frequency of the recorded data for use in readily locking a PLL for obtaining a bit clock during a reproducing or playback operation. The postamble PSA following the video and audio data recording area is, in turn, followed by an Inter Block Gap IBG, and then by a record area for only audio data which record area is preceded and followed by a preamble PRA and a postamble PSA, respectively. Such record area for only audio data is used for after-recording. At the head leaving end portion of the track there is a record area for sub-data which is preceded and followed by a preamble PRA and a postamble PSA, respectively, and separated from the record area for only audio by an Inter Block Gap IBG. Finally, there is a margin where no data is recorded at the head leaving end of the track.

Figure 15B:
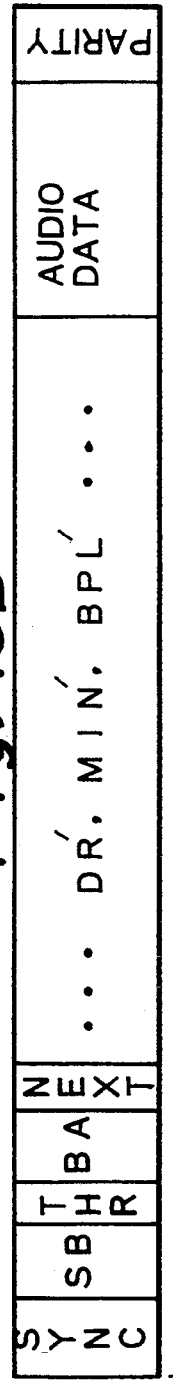
FIG. 15B shows in detail a data sequence or format for each of the sync blocks in a video and audio recording area of the track in FIG. 15A.

The video and audio record area is composed of a large number of sync blocks. The data sequence of each of the sync blocks is shown in detail on FIG. 15B. As there shown, at the beginning of each sync block, there is a block synchronous signal SYNC indicating the beginning of a block, and which is followed by a sync block SB for indicating that the following data is of a sync block. At the area following the sync block SB, there is recorded a threshold value THR for determining the number of bits to be assigned for ADRC. At the area following the THR value, there is recorded a block address BA for indicating an address on the screen to which the corresponding block corresponds. At the area following the block address BA, there is an area NEXT containing data representing the length of the respective block, and which is, in turn, followed by an area containing encoded data generated by the ADRC and composed of a dynamic range DR', an average minimum value MIN', and a BPL which represents a group of code signals corresponding to picture elements. Audio data is positioned in a portion of the sync block different from that containing the picture data and, at the end of the sync block, there is an area containing a parity of an error correction code. The sequence of the sync block in FIG. 15B is given only by way of example. Thus, in consideration of the data amounts of the video data, audio data and parity, the sync block may have such data appearing therein in a different, sequence.

The data sequences in the sync blocks positioned in the record area for only audio data and in the record area for only sub-data are approximately the same as the data sequence described above with reference to FIG. 15B. More specifically, a data sequence of a sync block in the sub-data record area is shown on FIG. 15C to start with a block synchronous signal SYNC for indicating the beginning of a block, and which is followed by an ID signal. The ID signal contains a code for identifying a sub-data area, a start ID for indicating the beginning of a program and which is also called an index signal, a frame ID, a track address, a skip ID for indicating that a certain area is to be skipped without reproducing the same, a program number, a sync block number an so forth. The ID signal is used when pictures are restored or reproduced from playback data obtained in the high speed playback mode as well as in the normal playback mode. Following the area for the ID signal, there is an area for the sub-data in which additional data, such as, a title, a still picture and the like are recorded. At the end of the sync block shown in FIG. 15C there is an area for a parity of an error correction code.

Figure 15C:
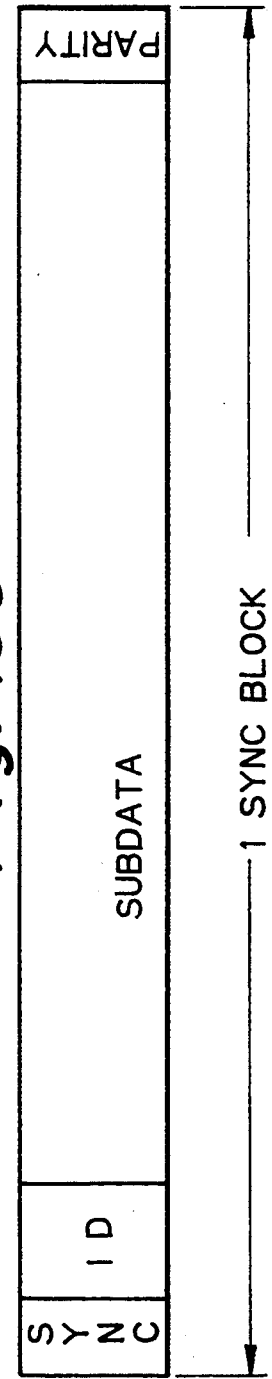
FIG. 15C shows in detail a data sequence of a sync block in a subdata area of the track in FIG. 15A.

As earlier noted, each sync block in the record area for only audio data may have a data sequence similar to that described with reference to FIG. 15C, but with the area shown thereon to contain sub-data being instead provided for audio data.

With respect to the data sequence of the video data in the sync block described with reference to FIG. 15B, it is possible to use instead the data sequence or format proposed by the assignee of the present application in Japanese Patent Application No. SHO 63-317738. Furthermore, with reference to the sub-data sync blocks, it is possible to use instead of the data sequence shown on FIG. 15C, a format which is the same as that employed in DAT (digital audio tape) recorders.

Figure 16:
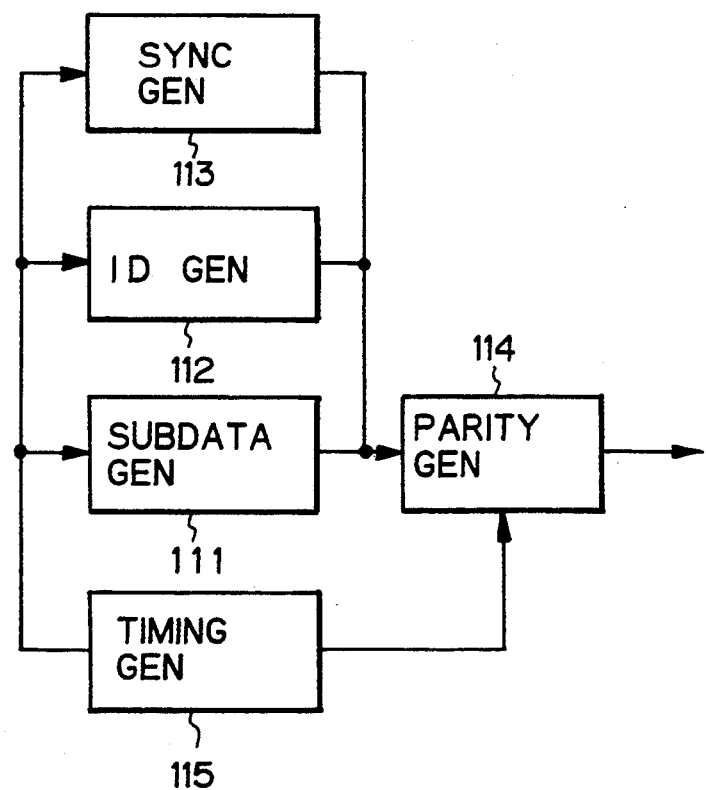
FIG. 16 is a block diagram showing an example of a subdata generation circuit.

The sub-data supplied through the input terminal is to the parity generation circuit 17 on FIG. 1 may be provided by a circuit shown on FIG. 16 to include a sub-data generation circuit 111 in which the generated sub-data is determined by the user, for example, through operation of a keypad, an ID signal generation circuit 112, and a sync signal generation circuit 113. There is also provided a timing signal generator 115 which suitably times the generation circuits 17, 111, 112 and 113 so as to provide the desired data sequence, for example, as shown on FIG. 15C, when the outputs of the sub-data generation circuit 111, the ID generation circuit 112 and the sync generation circuit 113 supplied to the parity generation circuit 17 and the respective parity from the latter are supplied through the mixing circuit 14.

Figure 17:
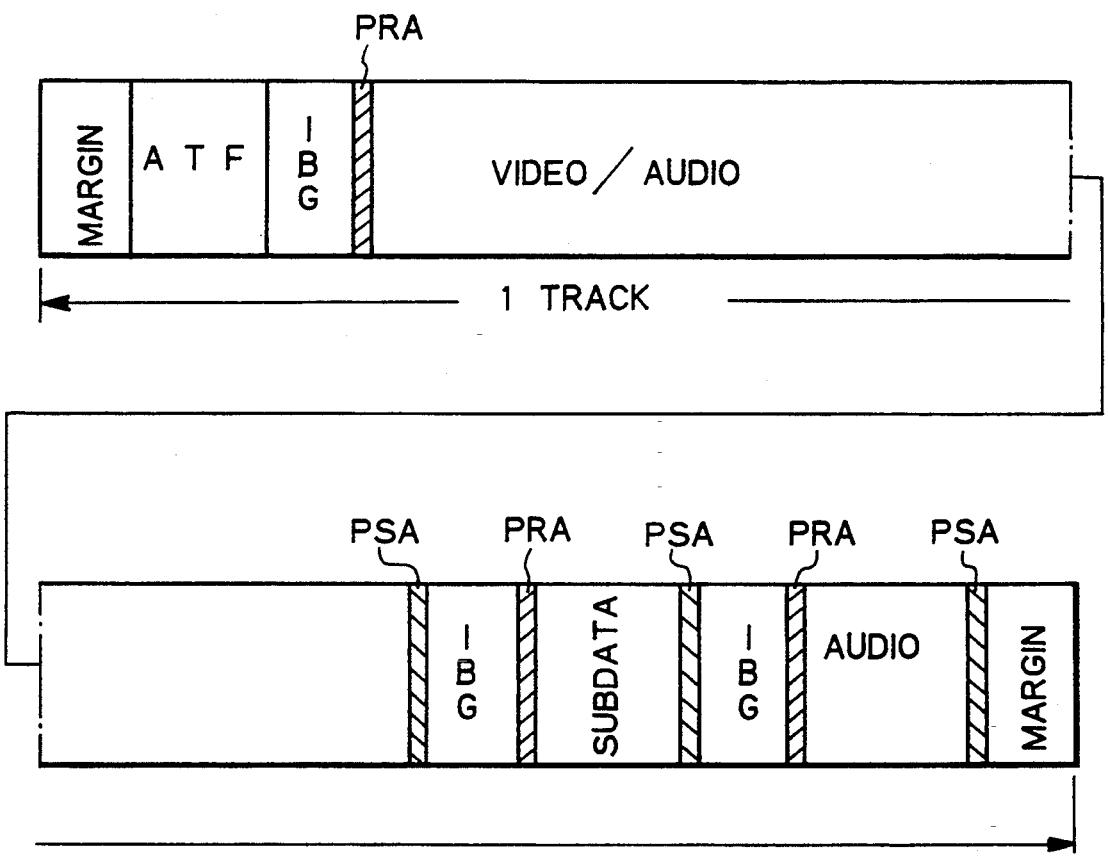
FIG. 17 is a schematic diagram similar to that of FIG. 15A, but showing another data sequence or format for a track according to another embodiment of this invention.

Referring now to FIG. 17, it will be seen that, in a data sequence for a track in accordance with another embodiment of this invention, the record area for sub-data and the record area for only audio may be interchanged so that the record area for the after-recording of audio data is disposed closer to the head leaving end of the track.

With the data sequence shown on FIG. 17, the record area for the sub-data is positioned further from the head leaving end of the tape so that it is most likely to be contacted by a rotary magnetic head in the high speed playback mode, with the result that the ID signal included in the recorded sub-data is properly reproduced. Furthermore, the data sequence shown on FIG. 17 is readily compatible with the data sequence of a digital VTR employing a small winding angle Θ, and hence scanning relatively short tracks on the tape. Since the record area for only audio data is used for after recording, and since this function is not often required in a digital VTR, the location of the record area for only audio data near to the head leaving end of the track where spacing of the head from the tape tends to increase is not overly disadvantageous. In fact, since after recording is not often required in a digital VTR, the record area for only audio data may be omitted for permitting a further decrease in the winding angle Θ. For example, if the winding angle Θ is 174° and the angle of 15° from the head leaving end of the track is used for the record area for after-recording of audio, the omission of that record area permits the winding angle Θ to be reduced to 159°. Such decrease of the winding angle Θ reduces the frictional load applied to the tape during its longitudinal travel around the drum, and also reduces the possibility of damage to the tape edges. Moreover, by reducing the winding angle Θ, there is a reduced difference between the height of the tape where it enters into contact with the periphery of the drum and the height of the tape where it leaves the periphery of the drum and, as a result thereof, the structures provided for guiding the tape in its movement to and from the drum can be simplified so as to advantageously decrease the size of the VTR.

It is also to be understood that, if desired, one or more record areas for audio data may be provided in advance of the record area for video data, with each of such record areas for audio data being interposed between respective preamble and postamble areas and being separated from adjacent record areas by Inter Block Gaps.

It will be appreciated that, since an ATF or tracking pilot signal having a relatively low frequency is recorded at least at the head entering end portion of the track where the contact between the rotary magnetic head and the tape is most likely to be unstable, the other end portion of the track, that is, the head-leaving end portion of the track where the contact between the rotary head and the tape is relatively more stable, is available for the recording of sub-data and also, if desired, for the recording of only audio. Therefore, the sub-data can be stably reproduced.

Moreover, since the illustrated embodiments of the invention provide two record areas for the audio data, in the case where the same audio data is recorded in both record areas therefor, such recorded audio data can be employed, in the playback mode, for effecting error correction or interpolation. Further, when different audio signals are recorded in both record areas, for example, when after-recording is effected, the audio signals in the record areas can be selectively reproduced.

Having described illustrative embodiments of the invention with reference to the accompanying drawings, it is to be understood that the invention is not limited thereto, and that various changes and modifications can be effected therein by one skilled in the art without departing from the scope or spirit of the invention as defined in the appended claims.

What is claimed is:

1. An apparatus for magnetically recording digital data on a magnetic tape, comprising:
   block segmenting means for converting an input digital picture signal having an input data rate into digital data segmented into blocks each composed of a plurality of picture elements;
   encoding means for compressing and encoding the digital picture signal data of each of said blocks;
   channel encoding means for channel encoding the encoded data from said encoding means;
   audio signal encoding means for encoding an input digital audio signal;
   additional code generating means for generating an additional control code including subdata;
   means for providing pilot signal data for tracking;
   tape guiding drum means with rotary head means thereon for tracing successive tracks on a magnetic tape wrapped on said drum means, with each of said tracks having a head entering end, where said head means moves into contact with the tape, and a head leaving end where said head means moves out of contact with said tape; and means for mixing said pilot signal data, the channel encoded picture signal data from said channel encoding means, the encoded audio signal data from said audio signal encoding means, and said subdata so as to provide a sequence of data having an output data rate which is less than 25% of said input data rate, said sequence of data being supplied to said head means for recording in each of said tracks with said pilot signal data recorded at an end portion of the respective track adjacent said head entering end, said subdata recorded at a portion of said respective track adjacent said head leaving end, and said encoded picture signal data and encoded audio signal data recorded at a portion of said respective track intermediate said portions in which the pilot signal data and the subdata, respectively, are recorded.

2. An apparatus for magnetically recording digital data on a magnetic tape as in claim 1; further comprising means for causing said head means to record, in another portion of each track separate from said intermediate portion thereof, only encoded audio signal data from said audio signal encoding means.

3. An apparatus for magnetically recording digital data on a magnetic tape as in claim 2; wherein said encoded audio signal data are after-recorded in said other portion of each track separate from said intermediate portion thereof.

4. An apparatus for magnetically recording digital data on a magnetic tape as in claim 2; wherein said encoded audio signal data recorded in said other portion of each track are the same as said encoded audio signal data recorded with said encoded picture signal data in said intermediate portion of the respective track.

5. An apparatus for magnetically recording digital data on a magnetic tape as in claim 2; wherein said encoded audio signal data recorded in said other portion of each track are different from said encoded audio signal data recorded with said encoded picture signal data in said intermediate portion of the respective track.

6. An apparatus for magnetically recording digital data on a magnetic tape as in claim 2; wherein said other portion of each track in which only said encoded audio signal data are recorded is adjacent said head leaving end of the respective track.

7. An apparatus for magnetically recording digital data on a magnetic tape as in claim 6; wherein said portion of each track in which said subdata is recorded is between said head leaving end of the respective track and said other portion of the track in which only said recorded audio signal data is recorded.

8. An apparatus for magnetically recording digital data on a magnetic tape as in claim 6; wherein said portion of each track in which said subdata is recorded is interposed between said other portion in which only said encoded audio signal data are recorded and said intermediate position in which said encoded picture signal data and said encoded audio signal data are recorded.

9. An apparatus for magnetically recording digital data on a magnetic tape as in claim 1; wherein said encoding means includes discrete cosine transform (DCT) means.

10. An apparatus for magnetically recording digital data on a magnetic tape as in claim 1; wherein said encoding means includes adaptive dynamic range coding (ADRC) means.

11. An apparatus for magnetically recording digital data on a magnetic tape as in claim 1; wherein said magnetic tape is a metal evaporated (ME) tape.

12. An apparatus for magnetically recording digital data on a magnetic tape as in claim 1; wherein said channel encoding means includes scrambled non-return to zero (NRZ) means.

13. An apparatus according to claim 1; wherein said magnetic tape is wrapped on said drum means with a warp angle of less than 180°.

14. An apparatus for magnetically recording digital data on a magnetic tape as in claim 1; wherein said output data rate is approximately 15% of said input data rate.

15. An apparatus for magnetically recording digital data on a magnetic tape as in claim 1, wherein said input data rate is approximately 216 Mbps and said output data rate is approximately 31.5 Mbps.

16. An apparatus for magnetically recording digital data on a magnetic tape as in claim 1, wherein said input digital picture signal comprises a luminance signal having a maximum frequency of 13.5 MHz and two color difference signals each having a maximum frequency of 6.75 MHz.

17. An apparatus for magnetically recording digital data on a magnetic tape and for reproducing the recorded digital data from the magnetic tape, comprising:

block segmenting means for converting an input digital picture signal into digital data segmented into blocks each composed of a plurality of picture elements;

encoding means for compressing and encoding the digital picture signal data of each of said blocks;

channel encoding means for channel encoding the encoded data from said encoding means;

audio signal encoding means for encoding an input digital audio signal;

additional code generating means for generating an additional control code including subdata;

means for providing pilot signal data for tracking;

tape guiding drum means with rotary head means thereon for tracing successive tracks on a magnetic tape wrapped on said drum means, with each of said tracks having a head entering end, where said head means moves into contact with the tape, and a head leaving end where said head means moves out of contact with said tape;

means for mixing said pilot signal data, the channel encoded picture signal data from said channel encoding means, the encoded audio signal data from said audio signal encoding means, and said subdata so as to provide a sequence of data having an output data rate which is less than 25% of said input data rate, said sequence of data being supplied to said head means for recording in each of said tracks with said pilot signal data recorded at an end portion of the respective track adjacent said head entering end, said subdata recorded at a portion of said respective track adjacent said head leaving end, and said encoded picture signal data and encoded audio signal data recorded at a portion of said respective track intermediate said portions in which the pilot signal data and the subdata, respectively, are recorded;

playback means for reproducing data recorded in each of said tracks when scanned by said head means;

channel decoding means for channel decoding reproduced data from said playback means;

decoding means for expanding and decoding block-by-block the channel decoded data from said channel decoding means; and block disassembling means for converting the data expanded and decoded by the block into a digital-picture signal.

18. An apparatus according to claim 17; wherein said channel decoding means includes partial response class 4 calculation means.

19. An apparatus according to claim 17; wherein said channel decoding means includes Viterbi decoding means.

* * * * *